Aug. 19, 1969  F. A. SCHNEIDER  3,462,306
HIGH TEMPERATURE FUEL CELL
Filed Oct. 29, 1965  2 Sheets-Sheet 1

INVENTOR
FRIEDRICH AUGUST SCHNEIDER
BY
OSTROLENK, FABER, GERB & SOFFEN
ATTORNEYS

Aug. 19, 1969     F. A. SCHNEIDER     3,462,306

HIGH TEMPERATURE FUEL CELL

Filed Oct. 29, 1965     2 Sheets-Sheet 2

INVENTOR
FRIEDRICH AUGUST SCHNEIDER
By OSTROLENK, FABER, GERB & SOFFEN
ATTORNEYS

United States Patent Office 3,462,306
Patented Aug. 19, 1969

3,462,306
HIGH TEMPERATURE FUEL CELL
Friedrich August Schneider, Nuenen, Netherlands, assignor to Technische Hogeschool Eindhoven (Technical University Eindhoven), Eindhoven, Netherlands
Filed Oct. 29, 1965, Ser. No. 505,677
Claims priority, application Netherlands, Nov. 6, 1964, 6412977; May 11, 1965, 6505984
Int. Cl. H01m 27/04, 27/22
U.S. Cl. 136—86    14 Claims

ABSTRACT OF THE DISCLOSURE

There is provided a novel high temperature fuel cell comprising a liquid electrolyte and electrodes of novel form. The portion of the electrodes which is inserted in the electrolyte comprises a finely porous layer and a coarsely porous layer on top of said finely porous layer. The electrodes are so disposed in the electrolyte and the diameter of the pores of the fine and porous layers are controlled so that the electrolyte rises partially into the coarsely porous layer thus providing contact in the coarsely porous layer between the electrolyte and the gaseous fuel or oxidant without the need for provision of excess pressure in the gaseous medium to obtain such contact within the electrode.

---

The invention relates to a high temperature fuel cell with a liquid electrolyte and electrodes consisting of two adjacent porous layers with different classes of pore diameters, the finely porous layer being in contact with the electrolyte and having such average pore diameter that the capillary head of the electrolyte therein being greater than the thickness of the finely porous layer and the coarsely porous layer during operation of the cell being in contact with a gaseous fuel or oxidation agent. Such a fuel cell is known from British patent specification No. 667,298, published Feb. 27, 1952 and entitled "Improvements Relating to Galvanic Cells and Batteries."

The development of fuel cells working at high temperature has already been in progress for some years, but technical difficulties stand in the way of the manufacture of economically and practically usable fuel cells working at high temperature.

These technical difficulties principally relate to the solution of the following problems:

(1) to create and maintain an effective contact of the three phases fuel/oxidation agent, electrode and electrolyte
(2) sealing difficulties
(3) corrosion difficulties The cells according to British patent specification No. 667,298 make use of porous electrodes with average pore diameters and thickness such that at the gas side superatmospheric pressure is necessary in order to prevent that not only the entire electrode is filled up with electrolyte, but also that great parts of the surface at the gas side of the electrode are not "drowned" and become unoperative. With the aid of the superatmospheric pressure at the gas side the electrolyte level is adjusted within the electrode.

However, fluctuations in the superatmospheric pressure and variations in the pore size cause great difficulties. The small average pore diameter applied for electrodes in the known fuel cells, which is always below the order of magnitude of 0.1 mm., made a thin electrode necessary in order to obstruct the gas supply at the boundary line electrolyte-electrode as little as possible.

In other embodiments known until now said difficulties appear in different combinations and intensity.

(1) The Davtyan-Broers cell. Vide "High Temperature Fuel Cells," Ind. Eng. Chem. vol. 52, page 303, April 1960, G. H. J. Broers, J. A. A. Ketelaar. Here the electrolyte is present in a fixed matrix. The active part of the electrodes consists of a single porous layer. With this cell none of the three problem groups could be solved satisfactorily.

(2) The Broers cell with semi-fixed electrolyte. Vide "Fuel Cells," vol. 2, by G. J. Young, "Recent Developments in High Temperature Fuel Cell Research in the Netherlands," page 6, January 1963, G. H. J. Broers, M. Schenke. With this cell the sealing difficulties are solved by bringing the necessary seals outside the high temperature zone and the fixed matrix is replaced. The contact and corrosion difficulties remain unsolved.

(3) The Douglas cell, with liquid electrolyte, the immersion electrodes consisting of a fine porous layer which are fixed to a ceramic tube. Vide "Fuel Cells," vol. 1, by G. J. Young "Molten Alkali Carbonate Cells with Gas Diffusion Electrodes," page 129, June 1960, David L. Douglas. With this cell the 3-phase contact is achieved by gas pressure. With a double skeleton electrode according to aforementioned British patent specification No. 667,298 the contact problem can be solved in principle in this manner. Sealing and corrosion problem remain as before.

All these disadvantages are eliminated by the fuel cell according to the invention, which contains immersion electrodes with a double skeleton structure incased in ceramic tubes.

These are characterized in that the pore diameters of the coarsely porous layer of the electrodes have such a value that the capillary head of the electrolyte therein is smaller than the height of the part of the electrode projecting from the electrolyte. Capillary head is the height of a liquid column in a capillary tube, open at both ends, one end contacting a mass of liquid and the other end extending above the normal level of said liquid, said height measured perpendicular to the normal level of said mass of liquid, between said normal level and the meniscus in the capillary tube, the pressures at said normal level and at the meniscus being substantially equal.

As a result, on immersing a part of the finely porous layer in the electrolyte, this layer is completely filled up by capillary action and supplies electrolyte in the coarsely porous layer, in which then automatically an electrolyte level is obtained under the upper side of the electrode, without gas pressure being necessary therefore. This formation of the meniscus is achieved particularly easily and reproducably. If desired, one can of course influence the position of the meniscus by means of the gas pressure.

The pore diameters for which this occurs, are of course dependent on the operating capillary forces which in their turn are determined by the properties of the electrolyte and the electrodematerial, and in slighter degree by the properties of the gas. For the finely porous layer pore diameters smaller than 0.2 mm. appear to be satisfactory. For the coarsely porous layer a pore structure formed as tortuous as possible with wall to wall distances between 0 and 3 mm. is preferred, wall distances greater than 0.3 mm. dominating strongly.

Beside by sintering very coarse and fine metal particles such electrodes can be manufactured in a particularly simple way by winding, folding or otherwise packing of essentially sheetlike material (small thickness with respect to length and width) which has apertures and/or surface relief, which is brought in good hydraulic contact with the finely porous layer such as by sintering embedded metal powder of the electrode. Such material is e.g., gauze, expanded metal and corrugated perforated sheet metal.

In this manner the pores are always formed as tortuous as possible and additional active electrolyte surface is obtained per unit surface of electrode, in that particularly long meniscus-lines are formed by the sucked in electrolyte which do no longer lie in one and the same plane.

Air electrodes completely manufactured from silver can slowly dissolve when used for a long time. The dissolved silver is again deposited in the form of spongy metal under the gas electrode. This phenomenon can also be expected with electrodes which are composed of an other metal, which is also corroded by the electrolyte. The action of the cell can be influenced disadvantageously by this in the long run.

It was found that this disadvantage can be removed with an electrode, the finely porous part of which is made from an inert porous material.

Although the coarsely porous silver part of the electrode remains in contact with the molten electrolyte which fills up its pores partially, substantial corrosion of the electrode and deposition of dissolved metal on the other electrode does no longer take place.

As the inert porous material, e.g., stabilized porous zirconium oxide, as is commercially obtainable is very suitable.

Beside other ceramic materials which are resistant against the electrolyte, of course also inert metals such as gold, come into consideration. In order to obtain the required porosity these materials will as a rule be sintered.

The invention is elucidated but not limited by the drawing, in which.

Figure 1:
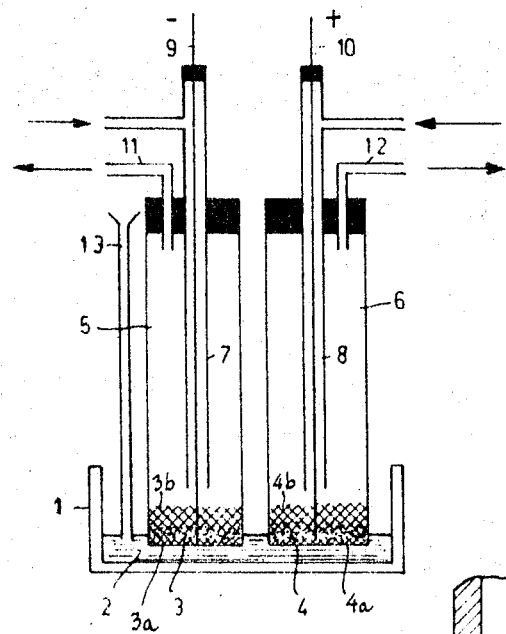
FIG. 1 shows a diagrammatic representation of an embodiment of the fuel cell of the invention.

FIG. 1 diagrammatically shows a cell with two electrodes 3, 4 immersed in an electrolyte bath 2, which is situated in tank 1. The electrodes 3 and 4 consist of a lower finely porous sintered layer 3a and 4a, respectively, in which a supporting layer of expanded metal is present, and a coarsely porous expanded metal layer 3b and 4b, respectively. Electrolyte tank 1, electrode tubes 5, 6 gas supply tubes 7, 8 gas discharge tubes 11, 12 and electrolyte filling tube 13 are preferably manufactured of very pure, compactly sintered $Al_2O_3$, which is completely resistant against the electrolyte. The space in the electrode tubes 5 and 6 above the electrodes 3 and 4 can partially be filled up, if desired, e.g., with porous $Al_2O_3$ stone to improve the heat insulation. The electrodes 3 and 4 consist of a finely porous part 3a and 4a at the bottom, and a coarsely porous layer 3b and 4b at the upper side. The current carriers 9, 10 consist preferably of the same material as their respective electrodes 3 and 4 in order to avoid corrosion. They may be welded to the end of the electrode strip, which can then be wound around the current carriers to form the electrode. The current carriers 9 and 10 are conducted outwardly through the gas supply tubes 7 and 8. The bottom end of the gas supply tubes 7, 8 is preferably situated closely above the electrodes to promote a good gas supply and discharge.

In order to fix the electrodes 3 and 4, in particular larger ones, the finely porous layers 3a and 4a of these may be sintered to the $Al_2O_3$ subes 5 and 6, e.g., by firing a silver layer on the $Al_2O_3$, and thereafter applying a copper layer, whereafter with Ni, as well as with Ag- or Cu-powder, a very strong sinterbond can be obtained.

A new very suitable method for fixing the finely porous part, and consequently the complete electrode, in the electrode tubes 5 and 6, comprises perforating the finely porous material and the electrode tube in a direction perpendicular to the centerline of the electrode tube, and passing a closely fitting small rod of an inert material, such as $Al_2O_3$, through this channel. This manner of fixing is suitable for electrodes, the finely porous part of which is manufactured of an other material than the coarsely porous part, as well as for electrodes which are completely manufactured of one metal only.

In order to secure a good adhesion of the electrolyte and thus a good formation of meniscus on the electrode, it is advantageous to provide the surface of the gauze, expanded metal and the like with a very thin, extremely porous layer of electrode material, for which various processes are known.

The finely porous layers 3a and 3b of the electrode, should, as is known, possess a high porosity, preferably not less than 70%. The sintering temperature of this layer should be sufficiently above the operating temperature of the cell to prevent after shrinking of the electrode in the cell, by which gas leakages could develop between electrode and bases wall. This radial shrinking can be effectively hindered during sintering as well as later in the cell by sintering a disc of gauze, expanded metal or perforated plate of the electrode material within the finely porous layer parallel to the base of the electrode.

The electrodes can be manufactured from all suitable materials. Oxygen (air)-electrodes with a metal oxide surface such as NiO, are preferably provided with an oxide layer after they are mounted in the electrode tube so that the oxide layer be completely homogeneous, which is desirable to obtain better corrosion resistance. For the same reason the part of the current carrier which operates at high temperature should be provided with a similar oxide layer.

Although in the preceding part only cell constructions are described with free molten salts as electrolyte it is also possible to use pastes of molten salts for these constructions, provided that these only contain so many solid particles that after melting sufficient melt can be absorbed by the finely porous electrode bottom by pressing the electrodes together.

In order to obtain an electrolyte resistance which is as low as possible and a current distribution which is uniform as possible, it is favourable to place groups of electrodes with opposite polarity in mutually surrounding configuration in a common electrolyte bath and to shunt these. It is favourable to place such a group of electrodes in an incasement consisting of one piece, which has preferably a honeycomb structure.

Figure 2:
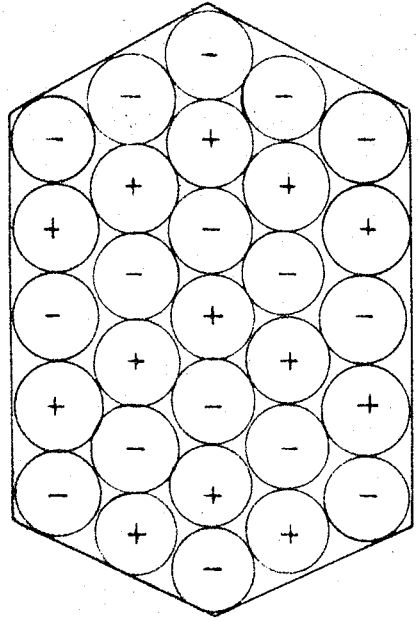
FIG. 2 shows some mutually surrounding configurations of electrode groups.
Figure 2:
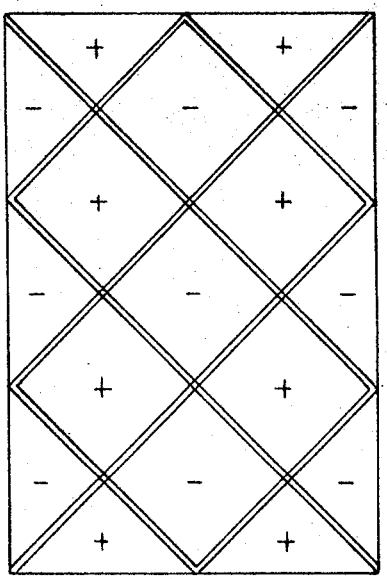
Figure 2:
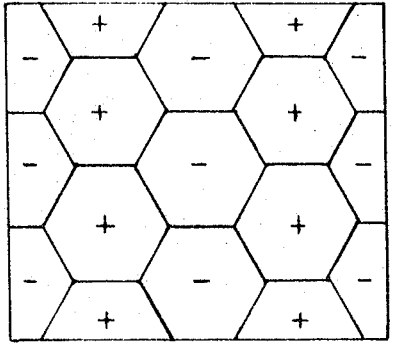

FIG. 2 shows some configurations in which electrodes of different polarities surround each other. The structure built up from tubes can be prepared most simply. However, it does not produce the smallest possible electrolyte resistance. The honeycomb structure is the most efficient one. It is most suitable to be manufactured in one piece. It produces the smallest possible electrolyte resistance, whereas also less material is necessary, so that at the start the operating temperature is reached more rapidly.

In order to avoid that melt creeps from the electrolyte tank into the furnace or insulation space, it is necessary to extend the wall of the electrolyte tank 1 so high that the upper side remains below the melting temperature of the electrolyte under all operating conditions.

Figure 3:
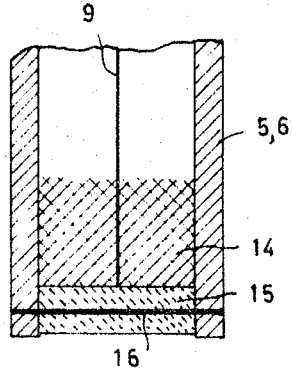
FIG. 3 shows a preferred embodiment of an electrode of the invention.

FIG. 3 shows an embodiment of an air electrode which is preferred. In the electrode tube of $Al_2O_3$ the coarsely porous silver electrode 14, in which a silver current output wire 9 is present. Under the coarsely porous part a finely porous bottom piece 15 of sintered stabilized $ZrO_2$ is present. This bottom piece is fixed in the electrode tube by means of fixing rod 16 of $Al_2O_3$.

The construction according to the invention is simple, reliable and robust. Sealings do not occur in the high temperature region. Temperature gradients along the electrodes hardly occur, because all electrodes of a cell or groups of cells lie in one surface which can be heated at the bottom in a simple manner, whereas concentration-gradients by the subdivision of the electrodes in shunted units also are avoided. Thereby no potential differences along the electrode surface, and consequently neither electrochemical corrosion of the electrodes, occur.

Except the electrodes with their current carriers, the cell does not contain metal parts and no corrosive metal combinations such as heat-resistant steel with electrode nickel or silver. Consequently the corrosion possibilities are restricted to the utmost. The three groups of difficulties, to wit 3-phase contact, sealing and corrosion are, consequently, solved together for the first time.

Further specific advantages of this combination are:

(1) The electrolyte can easily be kept at the right level during operation and faulty electrodes or cells can be replaced by new ones in a simple manner.

(2) The electrodes can be manufactured with much greater tolerances than up to now.

(3) Since all electrodes can lie in one surface, such a cell and even a battery of such cells is particularly suitable for gas heating, for which the gas from the cell or the battery which is not yet completely consumed can be used. It is consequently not necessary to use electrical energy for starting the battery. As is known, part of the completely burnt gas can be added to the air in order to provide the necessary $CO_2$ thereto.

(4) According to Example II a Ni gas electrode of the described construction can convert a mixture of $CH_4$ and $H_2O$ vapour into $CO_2$ and $H_2$ in good yields so that $H_2$ can do the electrochemical work. In this manner it is possible in the most simple manner to meet the known requirement that the gas conversion and the combustion of the conversion product should take place at the same temperature. Naturally also therefore a great roughness of the electrode material surface is of importance. The advantage obtained is particularly important.

Figure 4:
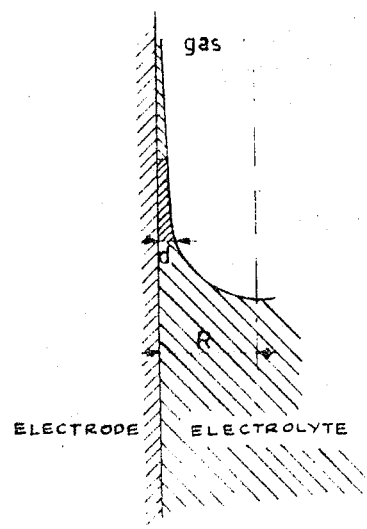
FIG. 4 shows the active part of the electrolyte meniscus.

FIG. 4 diagramatically shows a partial pore cross-section with therein an electrolyte meniscus. The strongly shaded part of the vertical extending meniscus is active for the current supply.

It is derived from an article of F. G. Will, J. Electrochem Soc. 110 (1963) 145. Therein it is shown that for low temperature gas electrodes, the reaction proceeds in the top of the curved meniscus which is formed by the electrolyte at the electrode surface. In view of the results obtained with cells according to the invention, it seems possible that also with these high temperature cells the electrochemical reaction proceeds according to the Will mechanism.

EXAMPLE I

A cell according to FIG. 1 with electrodes of Ni expanded metal (at the negative pole to which $H_2$ was supplied) and Ag-gauze (at the positive pole, to which air+$CO_2$ was supplied) with a $LiNaCO_3$-melt as electrolyte produced 150 ma. per cm.² net electrode surface cross-section at a cell potential of 0.7 v. at 750° C. cell temperature.

The dimensions of the expanded metal were:

|   | Millimeter |
| --- | --- |
| Stretching thickness | 1.2 |
| Material thickness | 0.22 |
| Mesh size | 2.2 x 1.5 |

The dimensions of the gauze were:

|   | Millimeter |
| --- | --- |
| Wire thickness | 0.2 |
| Mesh size | 1.5 |

EXAMPLE II

In a cell as described in Example I a mixture of $CH_4$ and $H_2O$ was converted at a cell temperature of 800° C. The height of the Ni-electrode to which the gas mixture was supplied, amounted to 2 cm., 1–1.5 cm. of which projected from the electrolyte.

At a current density of 100 ma. per cm.² effective electrode-tube cross-section the cell potential was 0.75 v.

The dimensions of the used Ni-expanded metal were:

|   | Millimeter |
| --- | --- |
| Stretching thickness | 1.2 |
| Material thickness | 0.25 |
| Mesh size | 2.2 x 1.5 |

What is claimed is:

1. A high temperature fuel cell comprising:
    (1) a cell body;
    (2) liquid electrolyte in said cell body;
    (3) a plurality of electrodes immersed in said electrolyte, wherein at least one electrode shall be a cathode and at least one electrode shall be an anode, said electrodes each comprising:
        (a) a hollow non-conductive electrode body;
        (b) means for passing gaseous fuel and oxidant mediums into said electrode bodies;
        (c) means for egress of said gaseous medium from said electrode bodies;
        (d) two adjacent porous layers wherein the pores of one layer are coarse and the pores of the second layer are fine, said porous layers being disposed at one end of said hollow electrode body in such a manner that the finely porous layer is at the outer end of said electrode body and the coarse layer is within said electrode body;
        (e) means for affixing said finely porous layer to said hollow non-conductive electrode body;
        (f) conductive means within said body in contact with said coarse porous layer;
    (4) said electrodes being disposed in the electrolyte in such a manner that the said finely porous layer is immersed in the electrolyte to a depth less than the thickness of said finely porous layer, and wherein the average pore diameter of said finely porous layer being such that the capillary head of the electrolyte over the upper surface level of the electrolyte in the cell external to said electrode body is greater than the distance by which the thickness of said finely porous layer extends above said upper external surface layer of the electrolyte and wherein the average pore diameter of said adjacently disposed coarsely porous layer being such that the capillary head of the electrolyte over the upper surface of said finely porous layer is less than the thickness of said coarsely porous layer;
whereby the pores of said finely porous layer are totally filled with electrolyte while the pores of the coarsely porous layer are partially filled with electrolyte and partially with the gaseous medium in said electrolyte body.

2. Fuel cell according to claim 1, characterized in that the pores of said coarsely porous layer are of a tortuous configuration.

3. Fuel cell according to claim 1, characterized in that the average pore diameter of pores in the coarsely porous layer is less than 3 millimeters.

4. A fuel cell according to claim 3, wherein said pore diameter is in the range of about 0.3 to 3 millimeters.

5. Fuel cell according to claim 1, wherein said coarsely porous layer comprises a plurality of layers of coarsely porous conductive sheets, said layers being in intimate contact with each other, the uppermost layer of said sheets being in contact with the gaseous medium and the lowermost sheets being in intimate contact with the finely porous layer.

6. Fuel cell according to claim 1, characterized in that in the finely porous layer there is embedded a disc of conductive porous sheet, the plane of said disc being disposed in a plane substantially parallel to the interface of said finely porous layer and said coarsely porous layer.

7. Fuel cell according to claim 1, characterized in that the finely porous layer of said electrode comprises an inert ceramic material.

8. Fuel cell according to claim 1, characterized in that more than two electrodes of opposite polarity are disposed in a substantially alternating arrangement, wherein all of said electrodes are in contact with the common mass of said liquid electrolyte.

9. Fuel cell according to claim 7, characterized in that the inert ceramic material is stabilized $ZrO_2$ zirconia.

10. A fuel cell according to claim 1, wherein said electrolyte body comprises a ceramic tube, and said means to keep said fine porous layer in contact with said electrolyte comprises a rigid rod of non-conductive material passing through said finely porous layer and through the walls of the said ceramic tube in a direction substantially perpendicular to the center line of said ceramic tube and being mechanically bonded to said tube.

11. A fuel cell according to claim 1, wherein the coarsely porous layer of said electrode is coated with a catalytically active metal oxide.

12. A fuel cell according to claim 1, wherein the plurality of electrodes are so spacially mutually disposed as to define a unitary structure.

13. A fuel cell according to claim 11, wherein the cross section of the structure of claim 11, viewed substantially parallel to the surface of the electrolyte, defines a honeycomb pattern, the solid portion of said honeycomb being provided by the walls of the electrode body.

14. A fuel cell according to claim 1, wherein the coarsely porous layer of said fuel electrode having a surface being catalytically active for conversion of carbonaceous fuel gas with water vapor to hydrogen and carbon dioxide, the thickness of said coarsely porous layer being such that the non-electrolyte filled parts of said coarse pores offer sufficient surface for conversion of said carbonaceous fuel gas with water vapor.

References Cited
UNITED STATES PATENTS

| | | | |
|---|---|---|---|
| 3,284,243 | 11/1966 | Von Sturm | 136—120 |
| 3,228,798 | 1/1966 | Hart | 136—86 |
| 2,980,749 | 4/1961 | Broers | 136—120 |
| 3,300,343 | 1/1967 | Huber et al. | 136—120 |

WINSTON A. DOUGLAS, Primary Examiner

H. A. FEELEY, Assistant Examiner

U.S. Cl. X.R.

136—120